United States Patent Office 3,288,825
Patented Nov. 29, 1966

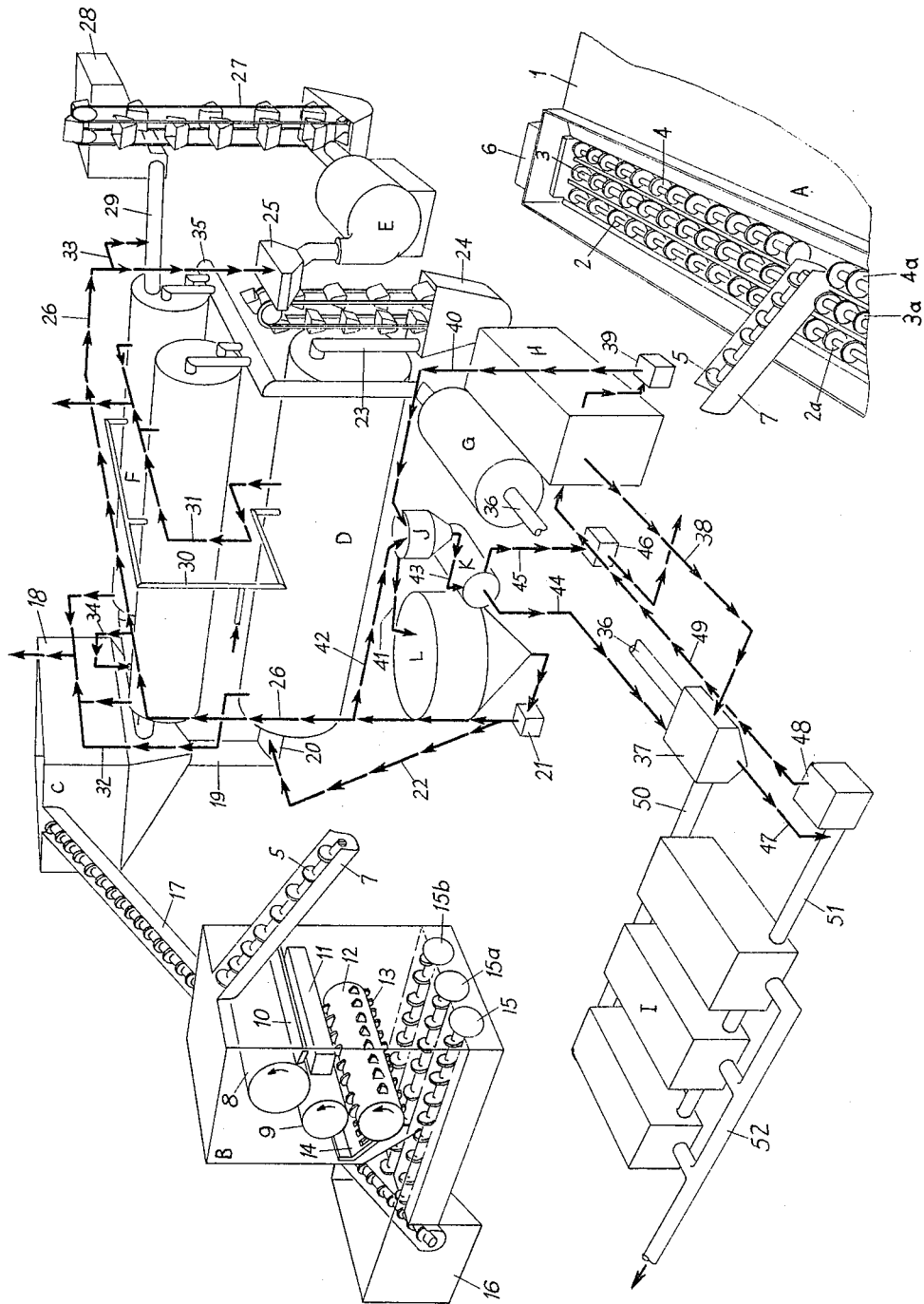

3,288,825
CONTINUOUS RENDERING PROCESS
Jack G. Keith, Los Angeles, Calif., assignor to Duke, Inc., Germantown, Ohio, a corporation of Ohio
Filed Apr. 10, 1963, Ser. No. 272,098
13 Claims. (Cl. 260—412.6)

This invention relates to a dry rendering system, and has to do more particularly with a continuous system for use in treating primarily animal and poultry by-products, such as fat, bone, and offal, to produce fat and pressed tankage or meat meal. At the outset, it is to be understood that the term fat, as used herein, refers to and includes both tallow and grease.

Fundamentally, there are two basic systems for rendering fat from animal matter, one being known as wet rendering and the other as dry rendering. Both systems employ heat to break down the protein cells to yield fat, but in wet rendering the fat is broken down by boiling the animal matter with water, whereas in dry rendering the fat is released by indirect heat. By and large, both systems are batch processes in which the cookers are charged with a predetermined quantity of animal matter, whereupon the charge is heated to render out the fat, the resultant liquid fat and residual materials being tapped off or drained from the cooker, with the subsequent separation of the liquid residual fat and solids.

While various efforts have heretofore been made to effect continuous rendering to the elimination of the batch type processing just characterized, such efforts have been generally unsuccessful due primarily to the wide divergence in the quality of the raw materials being handled, which variations require substantial adjustment of operating conditions. This is particularly true in dry rendering wherein the moisture content of the raw material dictates the operating conditions. Offal, for example, may have a moisture content of as much as 60%, whereas butcher shop scrap composed of fat, meat scraps, and bones may contain as little as 15% moisture. In most commercial operations wherein the raw materials are derived from numerous sources and are of diverse character and kind, it is extremely difficult if not impossible to standardize operating conditions—which is a necessity in a continuous operation. Since the raw material must be processed as soon as possible upon receipt by the renderer, there is no practical way for the renderer to program the handling of the raw materials in accordance with their kind and quality. This is no great problem to the batch renderer since the make up of a given cooker charge can be readily ascertained, i.e. whether it is primarily offal or meat scraps, bone and the like, and the charge processed accordingly.

It will be evident, however, that where the raw materials are being processed in a continuous system, batch control cannot be exercised and consequently continuous rendering has heretofore resulted in poorer quality fat. Some of the raw materials are overcooked and scorched, whereas others are undercooked and hence not fully rendered. Undercooking results in excessive moisture in the fat which adds to the difficulty of removing insoluble impurities and also results in loss of quality in storage. Improper cooking also results in an increase in free fatty acids and resultant lower glycerin yield, greater processing losses, and greater storage losses.

Accordingly, a principal object of the instant invention is the provision of a continuous rendering system which eliminates the difficulties enumerated above and results in an end product of uniformly high quality.

A further object of the instant invention is the provision of a completely integrated rendering system wherein the raw materials are hogged, equalized or homogenized, blended, cooked, drained, clarified, pressed and filtered, all in a continuous operation, the resultant products being fat and meat meal, the latter being in the form of a pressed cake suitable for immediate meal milling.

The foregoing, together with other objects of the invention which will appear hereinafter or which will be apparent to the skilled worker in the art upon reading this specification, are accomplished by that apparatus and procedures of which an exemplary embodiment will now be given.

Reference is now made to the accompanying drawing wherein the single figure comprises a three dimensional schematic view of a dry rendering system in accordance with the instant invention.

Briefly, in the practice of the instant invention, and in accordance with a preferred embodiment thereof, the raw materials are deposited in a raw material bin A from which they are continuously delivered to a pre-hogger B wherein tramp metal is removed and the raw material sized for uniformity of flow. From the pre-hogger the material is fed to the hogger C in which the material is further reduced in size so that it is essentially in the form of a slurry. From the hogger the comminuted material is fed into the equalizer or precooker D which comprises a generally cylindrical and steam jacketed vessel containing an agitator shaft having arms and into which the comminuted raw material is continuously and simultaneously fed, heated and ejected. The equalizer is an extremely important part of the system in that its primary purpose is to admix or homogenize the raw materials so as to compensate for variations in the class of material being handled and establish an essentially uniform moisture content throughout.

Upon ejection from the equalizer, the partially cooked material is transferred to the blender or secondary mill E wherein the hot slurry is subjected to hydraulic grinding which further comminutes the solids and at the same time removes a substantial amount of moisture therefrom. The material is next passed through the finishing cookers F wherein additional moisture is removed from the material and wherein a substantial amount of the fat is freed from the cells of the material being rendered. From the cookers the now fully cooked material is delivered to the drainer G into which the cooked material or finished cracklings and fat is continuously fed, drained of free fat and ejected. The free fat passes into a clarifier or foots drag tank H, whereas the cracklings are passed through a series of screw presses I wherein residual fats are removed from the cracklings and returned to the tank H. In the tank H the fat is settled and the bulk of the fines removed. From the tank H the fat is pumped to the constant head tank J from whence it is further refined in the desludging centrifuge and/or filter K or passed through the tallow surge tank L for recirculation through the system in a manner to be explained more fully hereinafter. Fat from the filter K will be piped to suitable holding tanks for subsequent shipment or storage.

With the foregoing brief description in mind, the detailed operation of the system will now be described.

*Raw material handling*

The raw materials being processed will be deposited in the raw material bin A, which preferably will comprise an elongated pit underlying the unloading dock 1 where the raw materials are delivered for processing. Mounted within the pit and extending lengthwise thereof are coacting sets of screw conveyors 2, 3 and 4, and 2a, 3a and 4a extending inwardly from opposite ends of the pit toward the centrally disposed screw conveyor 5. The sets of screw conveyors are power driven from their outermost ends, as by means of the drive mechanism 6; and their direction of rotation is such that raw materials deposited in the pit will be moved centrally toward the feed conveyor 5 for transfer to the pre-hogger. With this arrangement, some blending of the raw materials will occur as the raw materials are brought together at the center of the pit, although no particular effort will be made to segregate or classify the raw materials as they are deposited in the pit. As a practical matter, they will simply be dumped into the pit on an as-received basis. To the extent that whole carcasses, rib cages and the like are received, the set of screws will serve to break them into smaller segments, although such action is merely incidental.

The screw conveyor 5 is of the wrap around type with the side walls 7 of the trough projecting upwardly well above the screw 5 so as to assure free movement of the material therealong without jamming.

The pre-hogger

The pre-hogger B serves the dual function of reducing the raw material to uniform size and also removing tramp metal. Thus, the pre-hogger is provided with a pair of electro-magnetic rolls 8 and 9 which rotate in a counter-clockwise direction and, as the material delivered from the conveyor 5 passes downwardly over the rotating rolls, any pieces of metal, such as hog rings and the like, are attracted to the magnetized rolls and are retained thereby until mechanically removed, as by means of the scraper 10 which strips the roll 8 and deposits the metallic objects in the collection bin 11. A similar scraper and collection bin is provided for the magnetized roll 9, although it has been deleted from the drawing for purposes of simplicity of illustration.

Immediately beneath the magnetic rolls the material is acted upon by the hogger which is of known construction and comprises, in essence, a rotating cylinder 12 mounting spaced apart series of teeth 13 which are arranged to interdigitate with the fixed back plate teeth 14, the sets of teeth coacting to crush the animal material to a relatively uniform size. Preferably, the pre-hogger will reduce the material to chunks and pieces which are roughly in the form of two inch cubes.

Upon passage through the pre-hogger, the crushed material is transferred by the set of screw conveyors 15, 15a, and 15b to the bin 16 wherein the material is picked up by the delivery conveyor 17 and advanced to the hogger C.

The hogger

The purpose of the hogger is to further reduce the size of the raw materials, in this instance to essentially a mass having chunks and pieces roughly approximately one-half inch cubes. It is to be understood that the characterization of the chunks and pieces as cubes is merely for the purposes of giving an approximation as to the average size of the pieces since, obviously, the pieces will not be true cubes.

Preferably, the hogger will be of the shaver type wherein a revolving cylinder mounts sets of angularly inclined knives which coact with a fixedly mounted breaker plate to shave or shred the material to the desired reduced size. If desired, the hopper 18 may be arranged to selectively feed a pair of shaver type hoggers, thereby permitting the use of one of the hoggers while the other is being cleaned or repaired. In either event, the hogged raw material will be deposited into chute 19 which delivers it to an enclosed screw conveyor 20 for subsequent delivery to the equalizer or pre-cooker D.

The equalizer

The equalizer or pre-cooker is one of the most important facets of the instant invention in that it acts to compensate for variations in the class of raw materials being handled. That is, whereas the moisture content of the materials introduced in the equalizer may vary from 15% to 60%, the equalizer acts to admix and blend or homogenize the raw materials while at the same time removing on the order of 50% of the moisture therefrom. The equalizer is, therefore, of relatively large capacity, preferably having a capacity equal to substantially one hour flow rate. It thus provides a long residence time for the material during which the blending and homogenizing takes place.

In general, the equalizer is of cylindrical construction and steam jacketed with an agitator shaft mounting arms which rotate within the cylindrical vessel, thereby maintaining the material in a constant state of agitation. In this respect, it is analogous to a dry rendering cooker excepting that it is of substantially larger capacity. In an exemplary embodiment, the equalizer will be 8 feet in diameter and have a length of 24 feet. If desired, the agitator shaft and/or the arms may be hollow and filled with steam to further enhance the heating capacity of the unit. In an exemplary operation, the material in the equalizer will be heated so that, at its inlet end, the material will be at a temperature on the order of 170° F.–190° F., whereas at its outlet end the temperature of the material will be on the order of 190° F. to 210° F. It has been found that such temperatures can be readily maintained by passing steam at 75–125 p.s.i. through the surrounding steam jacket and through the hollow agitator shaft and/or arms, if such are employed. While the raw material is relatively cool when it enters the equalizer—the term relatively cool is used since some slight heating takes place by reason of the crushing and shaving in the pre-hogger and hogger—the constant agitation of the material within the equalizer rapidly admixes the incoming material with material already in the vessel, and consequently the mean temperature of the material even at the inlet end of the vessel will be on the order of 170° F.–190° F. The long residence time within the equalizer, coupled with constant agitation, assures an essentially uniform exit temperature which, as already indicated, is on the order of 190° F.–210° F. The outlet temperature may be readily maintained at the desired essentially constant level by controlling the rate of flow of material into the equalizer and/or by varying the heat input in the steam jacket and related mechanism of the equalizer. It is also contemplated that fat from the storage tank L may be recirculated through the equalizer; and to this end, the tank L is provided with a pump 21 on its outlet side having suitable conduit means 22 leading to the inlet end of the equalizer. The material entering the equalizer may be thus primed with fat if it is found to be too dry; and the fat introduced into the equalizer may also be utilized to assist in controlling the temperature of the material in the equalizer.

The semi-finished or partially cooked material is ejected from the equalizer through outlet 23 and deposited in the flow control elevator 24 which meters the material into the hopper 25 forming a part of the secondary mill or blender E. Preferably, the flow control elevator 24 will be the control center for the entire system, and by either speeding it up or slowing it down, the rate of flow of the material being processed can be altered. To this end, the entire conveying system and related operating mechanism, beginning with the screws in the raw material pit and continuing throughout the system, may be interlinked for timed operation. Additional control over the material in the equalizer, particularly its residence time, may be achieved by one or more temperature or liquid level probes in the equalizer which will act to speed up or slow down the rate of delivery of raw material thereto in accordance with the desired operating conditions.

The blender

This mill is a standard piece of reduction equipment wherein the material is hydraulically ground in its own liquid (fat and moisture). In the mill, the material is contacted by a multiplicity of hammers arranged about the periphery of a rotating drum, such hammers acting to force the material through a fixed perforated plate which acts to further reduce the size of the solids to the consistency of rice, i.e. having an average size of about one-eighth inch.

It is important that the material being ground is hot and it must also be essentially fluid, i.e. in the nature of a slurry. To this end, it is usually desirable to prime the material as it enters the blender, and this may be conveniently done by means of a conduit 26 operatively connected to the pump 21. Desirably, the material introduced into the blender will contain on the order of 45% by weight fluid in the form of free fat and moisture. When in such consistency the free fat will be readily visible in the cracklings.

It may be noted that a considerable amount of moisture will be removed during the grinding operation due primarily to flash drying. From the blender, the slurry is delivered to the bucket elevator 27 which deposits it in the hopper 28 for delivery through screw conveyor 29 to the finishing cookers F.

The finishing cookers

Essentially, the finishing cookers are similar in construction to the equalizer, being generally cylindrical and steam jacketed with a steam heated agitator shaft mounting arms for continuously agitating the material as it passes through the cooker. By and large, the cookers are of smaller capacity than the equalizer and have limited retention capacity. Whether one or more cookers is employed depends upon the capacity of the system and the size of the cookers. In the exemplary embodiment illustrated the cookers will have an aggregate holding time on the order of one half hour where the capacity of the equalizer is one hour flow rate.

The finishing cookers comprise a critical phase of the cooking operation in that the freeing of fats from the cells is finished-off and the moisture content of the material is further reduced. As in the case of the equalizer, the finishing cookers are heated by steam; and to this end, a common steam supply system 30 may be utilized to introduce steam into the jackets surrounding both the equalizer D and the finishing cookers F. Where the agitator shafts and/or agitator arms are also internally heated, the steam for such purposes may also be supplied from the supply line 30. It will be understood, of course, that suitable condensate lines will be provided for maintaining the circulation of steam through the cookers, although such have not been illustrated. It also may be observed at this juncture that the entire system operates at atmospheric pressure, and to the extent that moisture vapor is generated within the equalizer D and cookers F, such moisture vapor is removed by means of one or more exhaust systems, such as the systems 31 and 32 which, as will be understood by the worker in the art, may be provided with entrainment traps, condensers and the like for handling the exhaust vapors.

Preferably, the finishing cookers will operate at a temperature of about 225° F. at the inlet end of the leading cooker, with the finished material exiting from the trailing cooker, if one be used, at about 240° F.–275° F. Desirably, the moisture content of the material ejected from the cookers will be on the order of 7%. Obviously, as the moisture content of the material declines, the fat content must rise in order to maintain its liquid consistency. Preferably, the material ejected from the finishing cookers will contain a minimum of 40% fluids by weight. As in the case of the equalizer, either or both of the finishing cookers may be primed with recirculated fat, and to this end the recirculating conduit 26 may be provided with branch conduits 33 and 34 for selectively priming the finishing cookers. Similarly, the control of the discharge temperature of the material may be effected by controlling the rate of flow of materials through the cookers and/or by varying the steam input to the surrounding jacket and agitator mechanism.

Upon discharge of the cracklings and fat from the finishing cookers, the materials are continuously transferred by screw means 35 to the percolator or drainer G.

The drainer and clarifier

The drainer G is of the flow through type wherein the incoming material is advanced through a centrally disposed rotary screen through which the fat passes and is separated from the cracklings, the separated fat flowing by gravity into the clarifier or settling tank H. The residue, on the other hand, move lengthwise of the rotating screen and are conveyed through screw means 36 to the prepress choke screen 37 the function of which will be explained more fully hereinafter.

The clarifier or settling tank—which is sometimes referred to as a foots drag—is a typical mechanical settling tank which returns the fines over a top screen deck and transfers them, as by means of conduit 38, to the prepress choke screen 37. Thus, the bulk of the fines are removed in the clarifier, and the fat which settles to the bottom of the tank is pumped by means of pump 39 into the constant head tank J which overflows into the storage tank L.

It will be noted from the drawing that the conduit 26 which serves to prime the finishing cookers F also includes a branch conduit 42 which returns to the constant head tank J. The fat is thus continuously recirculated through tank J from storage tank L so as to maintain the residual fines in suspension before refining.

When it is desired to remove fat from the system, the conduit 43 is opened, thereby feeding fat from the constant head tank J into the desludging centrifuge K wherein the residual fines are separated from the fat by mechanical action. The fines are then conveyed through conduit 44 to the prepress choke screen 37. The fat phase from the centrifuge passes out through conduit 45 where pump 46 advances it to storage as a finished product or on to further processing of conventional character.

The screw presses

The combined fines from the clarifier H and centrifuge K, together with the cracklings from the drainer G, are fed to the prepress choke screen 37. This unit has gapped flights which force the fines and cracklings through a plug, resulting in prepressing and the elimination of surplus fat ahead of the presses. Fat from the choke screen will be delivered through conduit 47 for return, by means of pump 48 and conduit 49, to the clarifier H for recirculation.

The cracklings and fines proceed from the choke screen to the presses I, which are fed by means of veri-driven volumetric screw feeder 50 which acts to sequentially fill the several presses to capacity. The presses I may be of known construction embodying hydraulic sleeve type chokes with automatic compensating characteristics to allow for varying types of material. In operation, the chokes will reverse automatically on amperage signals from the press motors to clear the press cages and avoid restriction and shut down.

Pressed fat from the presses is delivered by conduit 51 to the pump 48 for return to the clarifier H along with the fat from the choke screen 37. The presses cracklings or meal cake is conveyed by screw means 52 to a suitable collection station for subsequent handling, or the press cake may be delivered directly to a meal system for milling.

As should now be apparent, the continuous rendering system just described provides for the continuous and essentially automatic rendering of animal and similar fat containing material in an integrated system. The system enables the user to readily handle all classes of raw materials without limitation as to their kind or character, employing essentially standardized operating conditions. The instant invention has proven itself to be highly efficient in commercial operation and, regardless of the character of the raw materials being processed, produces a consistency high quality grade of fat.

It should be evident to the skilled worker in the art the modifications may be made in the system without departing from its spirit and purpose. For example, depending upon the size of the system and the quantity of material being handled, structural modifications may be made in the various components. For example, it has already been pointed out wherein one or more finishing cookers may be utilized, depending upon the capacity of the equalizer and volume of raw material being handled. Similarly, in a small, relatively low capacity unit, it is possible to eliminate the pre-hogger and deliver the raw material directly to the hogger. Of course, where this is done, there will be some sacrifice in quality control as respects the uniform reduction in the size of the raw materials. Since such uniformity has a direct bearing on the overall efficiency of the system, it is preferred that the pre-hogger be employed in order to insure quality control. Instead of screw presses, fat may be removed from the residual material by solvent extraction or by a combination of press and solvent extraction operations.

Having thus described the invention in an exemplary embodiment, what it is desired to secure and protect by Letters Patent is:

1. A continuous process for the dry rendering of raw materials in the form of animal, poultry and fish by-products to produce fat and tankage, including the steps of (a) reducing the raw materials to a mean particle size, (b) feeding the particles of raw materials into a holding vessel and thoroughly mixing the said particles while heating them to a temperature of from 190° F. to 210° F., including the step of maintaining the particles of raw materials in the holding vessel for a residence period at least equal to substantially one hour flow rate of the raw materials being processed, whereby to homogenize the raw materials and remove a portion of the moisture therefrom, (c) continuously withdrawing the homogenized raw materials from the holding vessel and further reducing the mean particle size thereof, (d) feeding the so reduced raw materials to a cooking vessel and heating the said materials to a temperature of from 225° F. to 275° F. to further reduce the moisture content thereof and to free the fats therefrom, and (e) continuously removing cooked materials from the cooking vessel and thereafter separating the freed fats from the tankage.

2. The process claimed in claim 1 including the step of re-circulating a portion of said separated fats to prime said raw materials at the initiation of said mixing action.

3. The process claimed in claim 2 including the step of re-circulating a portion of said separated fats to prime said raw materials at the initiation of the cooking step.

4. The process claimed in claim 3 wherein said cooking step is continued until the moisture content of said raw materials is substantially no greater than 7%.

5. The process claimed in claim 4 including the step of subjecting the cooked raw materials to a pressing operation, whereby to remove residual fats therefrom.

6. A continuous process for the dry rendering of raw materials in the form of animal, poultry and fish by-products to produce fat and pressed residue, including the steps of (a) reducing the raw materials to a mean particle size of substantially ½ inch cubes, (b) feeding the said particles of raw materials into a holding vessel and thoroughly mixing the said particles while heating them to a temperature of from 190° F. to 210° F., including the step of maintaining the raw materials in the said holding vessel for a predetermined residence period until the raw materials have been homogenized and substantially 50% of the moisture has been removed therefrom, (c) continuously withdrawing homogenized raw materials from the holding vessel and further reducing the mean particle size thereof, (d) subjecting the homogenized and reduced materials to a continuous cooking operation to further reduce the moisture content thereof and to free a substantial portion of the fats therefrom, (e) continuously removing cooked materials and separating the freed fats from the residue, and thereafter (f) pressing the residue to remove residual fats therefrom.

7. The process claimed in claim 6 including the step of re-circulating a portion at least of said separated fats to selectively prime said raw materials at the initiation of said mixing and homogenizing step, during the reduction of the mean particle size of said raw materials following said mixing and homogenizing step and at the initiation of said cooking step.

8. The process claimed in claim 7 wherein the temperature of said raw materials while being subjected to said mixing and homogenizing step is maintained substantially in the range from 190° F. to 210° F.

9. The process claimed in claim 8 wherein the predetermined residence period during which said raw materials are subjected to a mixing and homogenizing step in the presence of heat is substantially twice the duration of the residence period during which the raw materials are cooked.

10. The process claimed in claim 9 wherein the temperature of said raw materials during the cooking step is maintained in a range of substantially 225° F. to 275° F.

11. The process claimed in claim 10 wherein said raw materials, after the cooking step, and prior to the separation of the fats therefrom, contain a minimum of 50% fluids by weight.

12. The process claimed in claim 11 wherein the moisture content of said raw materials at the end of the cooking step is substantially no greater than 7%.

13. The process claimed in claim 12 wherein the separated fats are subjected to centrifugal action to separate residual fines from the fats.

References Cited by the Examiner

UNITED STATES PATENTS

| | | | |
|---|---|---|---|
| 1,518,926 | 12/1924 | Hiller | 260—412.6 |
| 2,875,222 | 2/1959 | Dormitzer | 260—412.6 |
| 3,046,286 | 7/1962 | Speer et al. | 260—412.6 |
| 3,057,699 | 10/1962 | Allbright et al. | 23—263 |

CHARLES B. PARKER, *Primary Examiner.*

A. H. SUTTO, *Examiner.*